US008886251B2

(12) United States Patent
Sung et al.

(10) Patent No.: US 8,886,251 B2
(45) Date of Patent: Nov. 11, 2014

(54) METHOD AND APPARATUS FOR HANDOVER, AND METHOD OF DETERMINING DELAY PARAMETER IN WIRELESS COMMUNICATION SYSTEM

(75) Inventors: Nak Woon Sung, Daejeon (KR); Sook Jin Lee, Daejeon (KR); Seungjae Shin, Daejeon (KR); Hyunsoo Yoon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 397 days.

(21) Appl. No.: 13/459,856

(22) Filed: Apr. 30, 2012

(65) Prior Publication Data

US 2012/0276946 A1 Nov. 1, 2012

(30) Foreign Application Priority Data

Apr. 29, 2011 (KR) .................. 10-2011-0041113

(51) Int. Cl.
*H04W 36/08* (2009.01)
*H04W 24/00* (2009.01)

(52) U.S. Cl.
CPC .............. *H04W 24/00* (2013.01); *H04W 36/08* (2013.01)
USPC ............ 455/525; 455/436; 455/437; 455/441

(58) Field of Classification Search
CPC ..... H04W 48/20; H04W 7/022; H04W 24/00; H04W 36/08; H04W 36/30; H04W 36/32
USPC .................................. 455/525, 441, 437, 436
See application file for complete search history.

(56) References Cited

U.S. PATENT DOCUMENTS

| 6,714,788 | B2 * | 3/2004 | Voyer ........................... 455/453 |
| 6,792,273 | B1 * | 9/2004 | Tellinger et al. .............. 455/442 |
| 7,136,366 | B2 * | 11/2006 | Kim .............................. 370/331 |
| 7,349,699 | B1 * | 3/2008 | Kelly et al. ................... 455/444 |
| 7,782,819 | B2 * | 8/2010 | Ishikawa ....................... 370/331 |
| 7,796,992 | B2 * | 9/2010 | Lee et al. ...................... 455/436 |
| 7,885,660 | B2 * | 2/2011 | Van Rensburg et al. ...... 455/442 |
| 8,000,707 | B2 * | 8/2011 | Dalsgaard et al. ............ 455/436 |

(Continued)

FOREIGN PATENT DOCUMENTS

| KR | 2010-0032605 A | 3/2010 |
| KR | 2010-0034209 A | 4/2010 |
| KR | 2010-0113406 A | 10/2010 |

OTHER PUBLICATIONS

Won-Ik Kim et al., "Ping-Pong Avoidance Algorithm for Vertical Handover in Wireless Overlay Networks," IEEE Vehicular Technology Conference (VTC 2007-Spring), pp. 1509-1512, Sep. 2007.

(Continued)

*Primary Examiner* — Hai V Nguyen
(74) *Attorney, Agent, or Firm* — Rabin & Berdo, P.C.

(57) ABSTRACT

When a handover apparatus of a user terminal enters a small scale cell within a macrocell area in a state that it is connected to a macrocell, the handover apparatus acquires a delay parameter of the small scale cell and delays handover for a time period of the delay parameter of the small scale cell and determines handover to the small scale cell. Thereby, handover to the small scale cell for a temporal user of the small scale cell can be reduced.

20 Claims, 7 Drawing Sheets

(56) References Cited

U.S. PATENT DOCUMENTS

| | | | |
|---|---|---|---|
| 8,068,838 B1* | 11/2011 | Dinan et al. | 455/436 |
| 8,190,145 B2* | 5/2012 | Csapo et al. | 455/423 |
| 8,249,585 B2* | 8/2012 | Tronc et al. | 455/429 |
| 8,489,099 B2* | 7/2013 | Zhao | 455/441 |
| 8,542,653 B1* | 9/2013 | Dinan et al. | 370/331 |
| 8,571,558 B1* | 10/2013 | Dinan et al. | 455/436 |
| 8,599,776 B1* | 12/2013 | Breau et al. | 370/329 |
| 8,606,274 B2* | 12/2013 | Borst et al. | 455/436 |
| 8,644,190 B2* | 2/2014 | Sachs et al. | 370/254 |
| 2002/0198000 A1* | 12/2002 | Voyer | 455/453 |
| 2003/0026248 A1* | 2/2003 | Hiroki | 370/352 |
| 2006/0084435 A1* | 4/2006 | Borsos et al. | 455/436 |
| 2007/0049279 A1* | 3/2007 | Van Rensburg et al. | 455/442 |
| 2007/0123252 A1* | 5/2007 | Tronc et al. | 455/427 |
| 2007/0270143 A1* | 11/2007 | Ishikawa | 455/435.1 |
| 2008/0076432 A1* | 3/2008 | Senarath et al. | 455/442 |
| 2009/0247164 A1* | 10/2009 | Kandukuri Narayan et al. | 455/436 |
| 2010/0069069 A1 | 3/2010 | Lee et al. | |
| 2010/0124172 A1* | 5/2010 | Tenny et al. | 370/242 |
| 2010/0124203 A1* | 5/2010 | Tenny et al. | 370/331 |
| 2010/0159922 A1* | 6/2010 | Tronc et al. | 455/427 |
| 2010/0309883 A1* | 12/2010 | Nagasawa et al. | 370/331 |
| 2012/0028642 A1* | 2/2012 | Schliwa-Bertling | 455/436 |
| 2012/0058763 A1* | 3/2012 | Zhao | 455/434 |
| 2012/0252464 A1* | 10/2012 | Borst et al. | 455/443 |
| 2013/0053025 A1* | 2/2013 | Lindoff et al. | 455/424 |

OTHER PUBLICATIONS

Wu Shaohong et al., "Handover Study Concerning Mobility in the Two-Hierarchy Network," pp. 1-5, IEEE Vehicular Technology Conference (VTC 2007-Spring), Sep. 2009.

Zdeneck Becvar et al., "Adaptive Hysteresis Margin for Handover in Femtocell Networks," International Conf. on Wireless and Mobile Communications (ICWMC 2010), pp. 256-261, Sep. 2010.

Xiaohuan Yan et al., "A Traveling Distance Predicction Based Method to Minimize Unnecessary Handovers from Cellular Networks to WLANs," IEEE Communications Letters, pp. 14-16, Jan. 2008.

SuKyoung Lee et al., A Probabilistic Call Admission Control Algorithm for WLAN in Heterogeneous Wireless Environment, IEEE Transactions on Wireless Communications, pp. 1672-1676, Apr. 2009.

G. Pollini, "Trends in Handover Design," IEEE Communications Magazine, vol. 34, No. 3, pp. 82-90, Mar. 1996.

S. Thajchayapong et al., "Mobility Patterns in Microcellular Wireless Networks," in proc. of IEEE Transactions on Mobile Computing, vol. 5, No. 1, pp. 52-63, Jan. 2006.

* cited by examiner

METHOD AND APPARATUS FOR HANDOVER, AND METHOD OF DETERMINING DELAY PARAMETER IN WIRELESS COMMUNICATION SYSTEM

CROSS-REFERENCE TO RELATED APPLICATION

This application claims priority to and the benefit of Korean Patent Application No. 10-2011-0041113 filed in the Korean Intellectual Property Office on Apr. 29, 2011, the entire contents of which are incorporated herein by reference.

BACKGROUND OF THE INVENTION (a) Field of the Invention

The present invention relates to a method and apparatus for handover, and a method of determining a delay parameter in a wireless communication system. More particularly, the present invention relates to a method and apparatus for handover between a macrocell and a small scale cell within the macrocell in a wireless communication system.

(b) Description of the Related Art

Currently, as a substitute for a macrocellular system with a radius of about 1 km, studies on small scale cellular networks such as a microcell with a radius of 50-100 m, a femtocell with a radius of 10-50 m, and a Wi-Fi hotspot have been actively performed. Such small scale cells have a merit that construction and operation cost of a base station is very low and they are generally installed in an indoor environment to provide a wireless data connection service to indoor users. Therefore, many mobile communication providers are actively pursuing construction of a hierarchical cellular network that installs a plurality of small scale cells within one macrocell radius.

Because several small base stations are simultaneously connected within one macrocell, the hierarchical cellular network can greatly increase processing quantity of a system and the number of simultaneous connections compared with an existing single macrocellular network.

However, when several small scale cells are included within the macrocell, the number handovers between the macrocell and the small-scale cell significantly increases. Accordingly, a macrocell base station that should simultaneously process handover to all small scale base stations within a macrocell area has a large burden. Therefore, it is necessary to suppress unnecessary handover through selective handover between a macrocell and a small scale cell.

Most studies on reduction and suppression of unnecessary handover until now have been focused on solving a ping-pong effect that occurs at a boundary point of two cells. The ping-pong effect indicates that a terminal continuously repeats handover with two base stations in a short time span of within several hundred milliseconds (ms) at a boundary point of two cells. The ping-pong effect occurs as signal intensity, i.e., signal strength, frequently changes at a boundary point of two cells. Therefore, for a hierarchical cellular network environment, studies for solving such a ping-pong effect have appeared. However, in a hierarchical cellular network environment, reduction of unnecessary handover is not sufficient with only a reduction of the ping-pong effect.

Because a small scale cell has a small radius, a ratio of a temporary user that uses a corresponding cell for a short time within several seconds and that again exits the cell is very high. According to a use pattern measurement result of a microcellular system that is disclosed in a document "Mobility Patterns in Microcellular Wireless Networks", users in which a connection time to a base station is 3 seconds or less make up 50% of all users and users in which a connection time to a base station is 10 seconds or less make up 70% of all users. This result shows that it is necessary to suppress a temporary user that is connected to a small scale cell within several seconds in addition to a ping-pong effect.

A representative study has been performed to prevent handover of such temporary users. By measuring a signal measurement result of a small scale cell base station and a moving speed and a direction vector of a user terminal, when it is determined that a user temporally stays in a cell, there is a method of not performing handover. Another method calculates a handover permission probability based on a measurement result of handover that moves from a macrocell to a small scale cell and of performing handover to correspond to a corresponding handover permission probability. However, these studies have a limitation of assumption that terminal users move in a uniform linear direction. Therefore, when applying a method of a corresponding study to an actual environment having complicated user mobility, it is expected that performance deterioration cannot be avoided.

In an existing handover technique, when a user terminal that is connected to a macrocell approaches a small scale cell base station and signal intensity of the small scale cell exceeds a given threshold, handover from the macrocell to the small scale cell is immediately performed. That is, in an existing handover technique, no mechanism that can prevent a temporary user from connecting is provided.

SUMMARY OF THE INVENTION

The present invention has been made in an effort to provide a method and apparatus for handover and a method of determining a delay parameter having advantages of reducing handover of temporary users in a hierarchical cellular network.

An exemplary embodiment of the present invention provides a method in which a user terminal that is connected to a macrocell performs handover to a small scale cell within a macrocell area. The method includes: determining whether a handover criterion is satisfied for a time period of a delay parameter of the small scale cell when the user terminal enters the small scale cell; and determining handover to the small scale cell when the handover criterion is continuously satisfied for the time period of the delay parameter.

The method may further include receiving the delay parameter from a network management entity through a control channel or a control message.

The determining of whether a handover criterion is satisfied may include: receiving a signal from a base station of the macrocell and a base station of the small scale cell for the time period of the delay parameter; determining whether the handover criterion is satisfied using the received signals for the time period of the delay parameter; generating a timer variable and calculating a delay time whenever the handover criterion is satisfied; and determining the handover when the delay time is larger than or equal to the time of the delay parameter.

The delay parameter may be acquired by applying numerical estimation to staying time measurement data of user terminals within an area of the small scale cell.

The determining of whether a handover criterion is satisfied may include: generating a timer variable whenever the handover criterion is satisfied for the time period of the delay parameter; removing the timer variable when the handover criterion is not again satisfied for the time period of the delay parameter; and determining the handover and removing the timer variable when the handover criterion is satisfied for the time period of the delay parameter, wherein the staying time measurement data may be measured using a generation time and a removal time of the timer variable and a connection holding time with a base station of the small scale cell.

The method may further include periodically reporting a generation time and a removal time of the timer variable and whether handover is performed to a base station of the small scale cell or a network management entity.

The method may further include determining a temporary user and sustaining a connection to a base station of the macrocell when a handover criterion is not continuously satisfied for a time period of the delay parameter.

Another embodiment of the present invention provides an apparatus for determining handover of a user terminal to a small scale cell within a macrocell area in a macrocell. The handover apparatus includes a handover determining unit and a handover performing unit. The handover determining unit acquires a delay parameter of the small scale cell and delays handover for the time period of the delay parameter of the small scale cell and then determines the handover when the user terminal enters the small scale cell. The handover performing unit starts handover with the user terminal and the small scale cell when the handover is determined.

The handover determining unit may determine handover to the small scale cell when a handover criterion is continuously satisfied for the time period of the delay parameter and sustain a connection to the macrocell when the handover criterion is not satisfied again for the time period of the delay parameter.

The handover determining unit may calculate a delay time by generating a timer variable whenever a handover criterion is satisfied for the time period of the delay parameter and determine handover to the small scale cell when the delay time is larger than or equal to the time of the delay parameter.

The handover apparatus may further include a reporting unit that periodically reports a generation time and a removal time of the timer variable to a network management entity, wherein the network management entity calculates the delay parameter using the generation time and the removal time of the timer variable and a connection holding time of user terminals within an area of the small scale cell.

Yet another embodiment of the present invention provides a method of determining a delay parameter in a network management entity that manages a small scale cell within a macrocell area. The method includes: calculating staying time measurement data of user terminals within a small scale cell area; calculating a delay parameter by applying numerical estimation to the staying time measurement data; and transmitting the delay parameter to a user terminal that enters the small scale cell in a state that is connected to the macrocell. In this case, handover to the small scale cell may be delayed by the user terminal for a time period of the delay parameter.

The calculating of staying time measurement data may include: receiving a connection holding time of user terminals in which the small scale cell has been connected to a base station from a base station of the small scale cell; receiving a generation time of a timer variable that is generated whenever a handover criterion is satisfied for the time period of the delay parameter and a removal time of the removed timer variable when a handover criterion is not satisfied again for the time period of the delay parameter and when the handover is determined in the small scale cell from user terminals, having received the delay parameter; and calculating the staying time measurement data using the connection holding time and a generation time and a removal time of the timer variable.

DETAILED DESCRIPTION OF THE EMBODIMENTS

Figure 1:
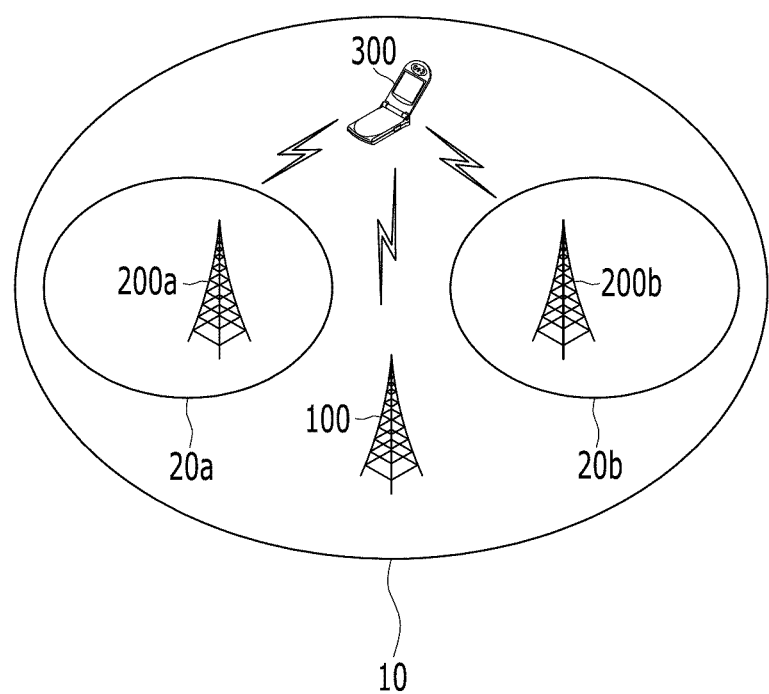
FIG. 1 is a diagram illustrating a wireless communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the specification and claims, unless explicitly described to the contrary, the word "comprise" and variations such as "comprises" or "comprising" will be understood to imply the inclusion of stated elements but not the exclusion of any other elements.

In this specification, a mobile terminal may indicate a mobile station (MS), a terminal, a subscriber station (SS), a portable subscriber station (PSS), user equipment (UE), and an access terminal (AT), and may include an entire function or a partial function of the terminal, the MS, the SS, the PSS, the UE, and the AT.

Further, in this specification, a base station (BS) may indicate an access point (AP), a radio access station (RAS), a node B, an evolved node B (eNode B), a base transceiver station (BTS), and a mobile multihop relay (MMR)-BS, and may include an entire function or a partial function of the AP, the RAS, the node B, the eNode B, the BTS, and the MMR-BS.

Hereinafter, a method and apparatus for handover and a method of determining a delay parameter in a wireless communication system according to an exemplary embodiment of the present invention will be described in detail with reference to the drawings.

FIG. 1 is a diagram illustrating a wireless communication system according to an exemplary embodiment of the present invention.

Referring to FIG. 1, the wireless communication system according to an exemplary embodiment of the present invention, for example, a hierarchical cellular network system, includes several small scale cells 20a and 20b within a macrocell 10. The macrocell 10 has a wide cell radius, for example, a radius of about 1 km, and the small scale cells 20a and 20b have a smaller radius than that of the macrocell 10. For example, a microcell having a radius of 50-100 m, a femtocell having a radius of 10-50 m, and a Wi-Fi hotspot may be used as the small scale cells 20a and 20b.

The macrocell 10 includes a macrocell base station 100 for managing the macrocell 10. The small scale cells 20a and 20b include small scale cell base stations 200a and 200b for managing the small scale cells 20a and 20b, respectively.

In such a hierarchical cellular network system, a user terminal 300 can perform communication by setting a connection to the macrocell base station 100, and when the user terminal 300 approaches one small scale cell 20a, by setting a connection with the small scale cell base station 200a, the user terminal 300 may perform communication.

In general, when the user terminal 300 that is connected to the macrocell base station 100 approaches the small scale cell 20a and satisfies a handover condition in the small scale cell 20a, handover from the macrocell 10 to the small scale cell 20a is performed. However, because the small scale cell 20a has a small radius, a ratio of temporary users in which a user terminal 300 stays a corresponding cell for a short time period of within several seconds and then exits the cell is very high. When handover is performed for such a temporary user, the macrocell base station 100 should perform frequent handover with all small scale cell base stations 200a and 200b of an area of the macrocell 10 and thus this may become a large burden.

Hereinafter, a handover method for reducing handover of temporary users that exit after temporarily staying in small scale cells 20a and 20b in a hierarchical cellular network system will be described in detail with reference to FIG. 2.

Figure 2:
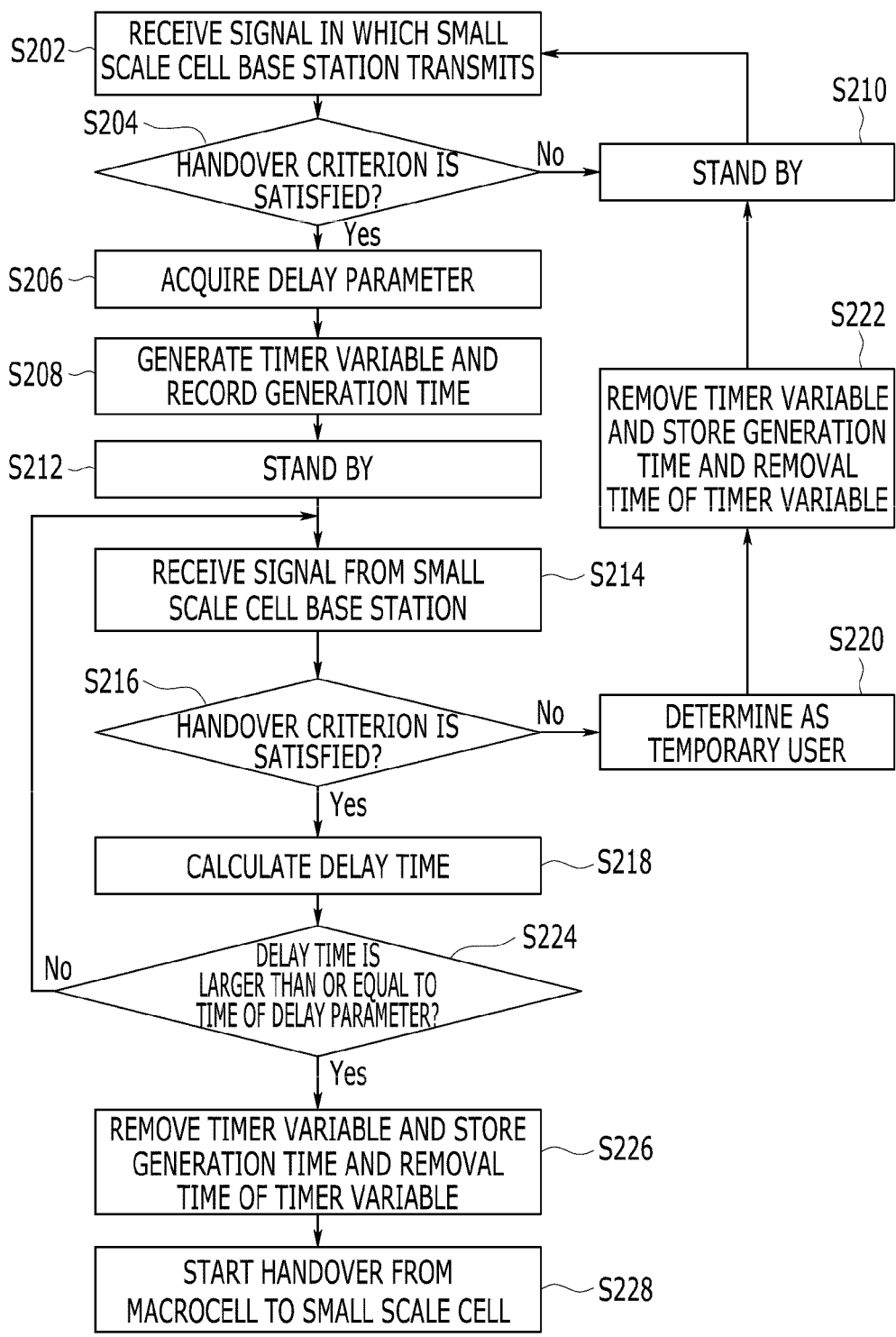
FIG. 2 is a flowchart illustrating a handover method according to an exemplary embodiment of the present invention.

FIG. 2 is a flowchart illustrating a handover method according to an exemplary embodiment of the present invention.

Referring to FIG. 2, when the user terminal 300 that is connected to the macrocell base station 100 approaches the small scale cell 20a, the user terminal 300 receives a signal that the small scale cell base station 200a transmits (S202).

The user terminal 300 determines whether a handover criterion to the small scale cell base station 200a is satisfied using a signal that the small scale cell base station 200a transmits (S204). The user terminal 300 periodically measures the intensity of the signal, for example, a signal to interference and noise ratio (SINR), that the small scale cell base station 200a transmits. A handover criterion from the macrocell 10 to the small scale cell 20a may be set differently according to setting of a use protocol specification and a network manager. A generally largely using handover criterion uses hysteresis and a threshold of a signal together, and may be represented by Equation 1. Hysteresis is an additionally added value in order to prevent a ping-pong effect.

$$S_m < S_{m,th} \text{ and } S_s \geq S_{m,th} + \text{delta}$$ [Equation 1]

In Equation 1, $S_m$ represents signal intensity of the macrocell base station 100, and $S_{m,th}$ represents a signal threshold of the macrocell base station 100. $S_s$ represents signal intensity of the small scale cell base station 200a, and delta represents a hysteresis value.

Equation 1 may be expressed in different forms according to a network environment and a network manager. Further, different handover criteria may be used.

In general, when a handover criterion of Equation 1 is satisfied, the user terminal 300 immediately starts handover.

However, according to an exemplary embodiment of the present invention, if a handover criterion is satisfied at step S204, the user terminal 300 acquires a delay parameter of the small scale cell base station 200a (S206). The small scale cell base station 200a may broadcast a delay parameter through a control channel for notifying the user terminal 300 of various control information. In this case, the user terminal 300 may obtain a delay parameter through a control channel of a received signal. In a cellular communication system, for example, a 3GPP-long term evolution (LTE) system that uses orthogonal frequency division multiple access (OFDMA) technology, the small scale cell base station 200a may transmit a delay parameter to the user terminal 300 through a physical broadcasting channel (PBCH), and in an IEEE 802.16-based system, the small scale cell base station 200a may transmit a delay parameter to the user terminal 300 through a frame control header (FCH).

Alternatively, the macrocell base station 100 may directly notify the user terminal 300 of a delay parameter of the small scale cell base station 200a at a periphery of the user terminal 300. In this case, in a 3GPP-LTE system, the macrocell base station 100 includes a delay parameter in a measurement control message and transmits the measurement control message to the user terminal 300, and in an IEEE 802.16-based system, the macrocell base station 100 includes a delay parameter in a neighbor advertisement message and transmits the neighbor advertisement message to the user terminal 300.

After the user terminal 300 acquires a delay parameter of the small scale cell 20a, the user terminal 300 generates a timer variable corresponding to the small scale cell 20a and records generation time of the timer variable (S208). If a handover criterion is not satisfied at step S204, the user terminal 300 stands by until receiving a next signal of the small scale cell base station 200a (S210).

As described above, when the user terminal 300 receives a signal from the small scale cell base station 200a, the user terminal 300 periodically measures intensity of the received signal. Therefore, after the user terminal 300 generates a timer variable, the user terminal 300 stands by until a signal is received from the small scale cell base station 200a (S212).

After the user terminal 300 generates a timer variable, when the user terminal 300 receives a signal from the small scale cell base station 200a (S214), the user terminal 300 measures intensity of the signal received from the small scale cell base station 200a and determines whether a handover criterion is satisfied (S216), and if a handover criterion is satisfied, the user terminal 300 calculates a delay time using a difference between a present time and a generation time of a timer variable (S218). In this case, if a previously satisfied handover criterion is again not satisfied, the user terminal 300 is determined to be a temporary user that exits an area of the small scale cell 20a (S220) and the user terminal 300 removes a generated timer variable and stores a generation time and a removal time of a corresponding timer variable (S222).

If a handover criterion is satisfied at step S216, the user terminal 300 sustains a timer variable of the small scale cell 20a and measures intensity of the received signal from the small scale cell 20a, and determines whether a handover criterion is satisfied. When several small scale cells having good signal intensity exist at adjacent locations, the user terminal 300 may generate several timer variables to correspond to each small scale cell.

The user terminal 300 measures intensity of a signal that is received from the small scale cell base station 200a, determines whether a handover criterion is satisfied, and determines whether a calculated delay time is larger than or equal to a time of a delay parameter of the small scale cell 20a (S224), and if the calculated delay time is larger than or equal to a time of a delay parameter of the small scale cell 20a, the user terminal 300 determines handover to the small scale cell 20a, removes a corresponding timer variable, and stores a generation time and a removal time of a corresponding timer variable (S226). Thereafter, the user terminal 300 starts handover to the small scale cell 20a (S228). In order words, the user terminal 300 stands by a time of the delay parameter and performs handover.

In this way, it is regarded that the user terminal 300 is receding from the small scale cell base station 200a within a smaller time than a time of a delay parameter and thus a timer variable is removed, whereby handover between the macrocell 10 and the small scale cell 20a may be automatically suppressed.

According to an exemplary embodiment of the present invention, in a hierarchical cellular network environment, by enabling temporary users that temporarily visit and exit the small scale cell 20a to sustain a connection of the macrocell 10 instead of performing handover of the small scale cell 20a, the number of handovers can be reduced.

However, a discrimination reference of a temporary user may be changed according to an environment of each of the small scale cells 20a and 20b and a network operation procedure of a manager. Therefore, in an exemplary embodiment of the present invention, a network manager can freely designate a discrimination reference time of a temporary user.

When a discrimination reference time of a temporary user of any small scale cell 20a is three seconds, in an exemplary embodiment of the present invention, users in which a connection time to the small scale cell 20a is less than three seconds should be suppressed to the maximum. However, a handover method according to an exemplary embodiment of the present invention has an original side effect. That is, by using a handover method according to an exemplary embodiment of the present invention, an improper delay phenomenon in which a temporary user connects may occur. This will be described through the following example. A network manager of the small scale cell 20a defines a user in which a connection time to the small scale cell base station 200a is within 5 seconds as a temporary user, and in order to prevent handover of the temporary user, a time of a delay parameter is designated as five seconds. In this case, when it is assumed that the user terminal 300 staying in an area of the small scale cell 20a for eight seconds exists, due to a time of a delay parameter, after the user terminal 300 enters an area of the small scale cell 20a, when five seconds has elapsed, handover is performed. Here, a performing time of handover is ignored. However, after the user terminal 300 enters an area of the small scale cell 20a, when eight seconds have elapsed, handover from the small scale cell 20a to the macrocell 10 should be performed. Therefore, an actual connection time to the small scale cell base station 20a is only three seconds. In such a case, when the user terminal 300 enters an area of the small scale cell 20a, if handover is immediately performed, a connection time to the small scale cell base station 200 becomes eight seconds, and thus the user terminal 300 may not be a temporary user.

That is, according to an exemplary embodiment of the present invention, due to delay of handover, an adverse effect in which a temporary user connects may occur. In consideration of such a problem, it is necessary to separately use a discrimination reference time of a temporary user and a time of a delay parameter. For example, in the small scale cell 20a, when a discrimination reference time of a temporary user is designated as five seconds and a time of a delay parameter is also designated as five seconds, a generation rate of improper delay may be lowered to the minimum. In another small scale cell 20b, a discrimination reference time of a temporary user is designated as five seconds, but when 3.8 seconds are set as a time of a delay parameter, a generation ratio of improper delay may be lowered to the minimum. This is because a cell staying time distribution pattern of the user terminal 300 changes by a characteristic of a location at which the small scale cells 20a and 20b are positioned and a moving characteristic of users.

In an exemplary embodiment of the present invention, when a discrimination reference time of a temporary user is given, a method of analyzing a staying time distribution pattern of users in a corresponding small scale cell and minimizing a generation probability of improper delay will be described in detail with reference to FIGS. 3 to 5.

Figure 3:
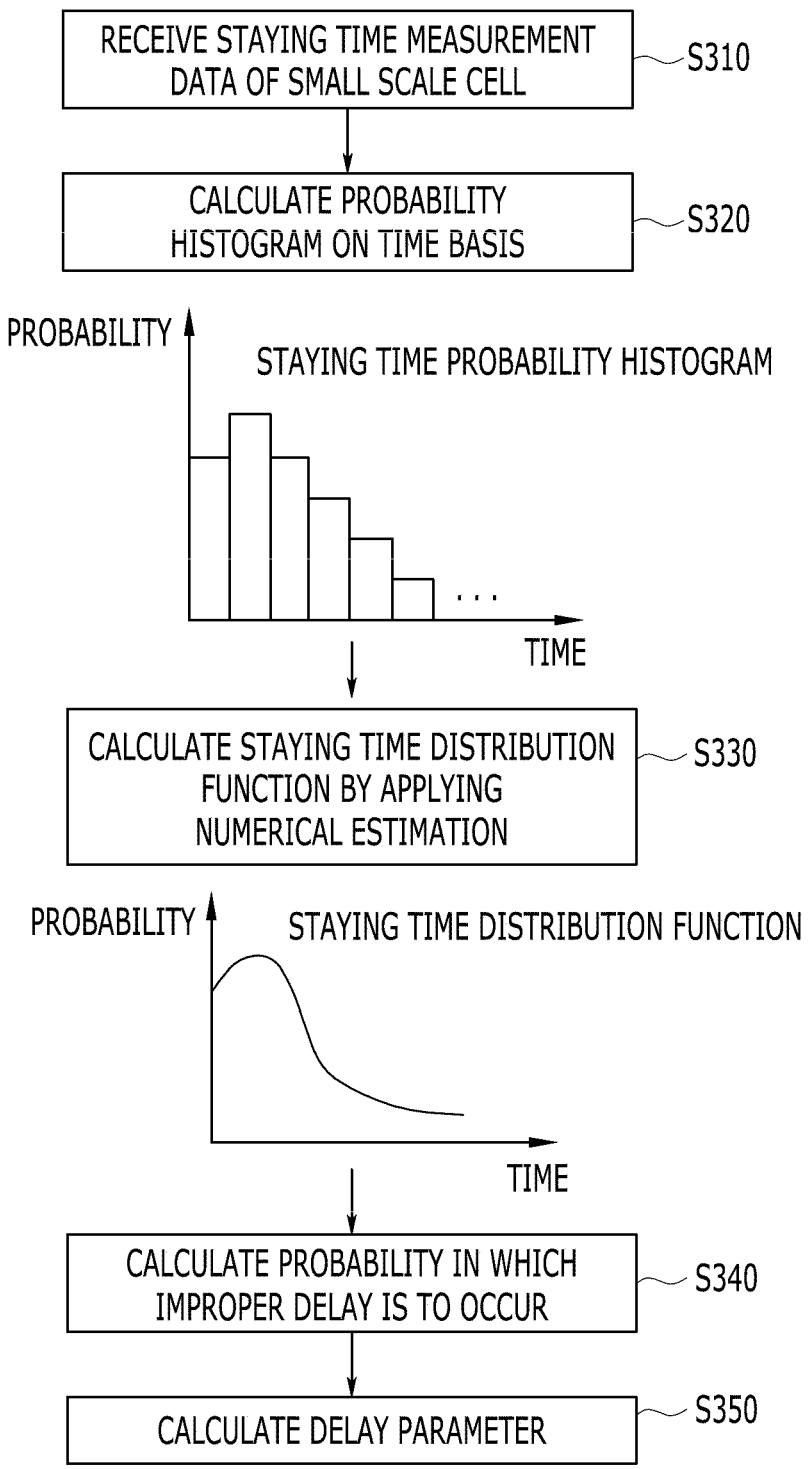
FIG. 3 is a diagram illustrating a method of calculating an optimal delay parameter according to an exemplary embodiment of the present invention.

FIG. 3 is a diagram illustrating a method of calculating an optimal delay parameter according to an exemplary embodiment of the present invention.

According to an exemplary embodiment of the present invention, a generating probability of improper delay is minimized with a method of calculating a delay parameter.

A calculation of the delay parameter shown in FIG. 3 may be directly performed in the small scale cell base station 200 and may be performed by a network management entity that manages several small scale cells. A radio network controller (RNC) in 3GPP-based technology and an access service network gateway (ASN gateway) in IEEE 802.16-based technology may perform such a function. Further, the network manager can directly analyze and obtain a staying time measurement statistic value. Hereinafter, it is assumed that a delay parameter is calculated in a network management entity.

Referring to FIG. 3, the network management entity receives staying time measurement data of each user terminal of a corresponding small scale cell from each of the small scale cell base stations 200a and 200b (S310).

The network management entity calculates a staying time distribution function using staying time measurement data of each user terminal of corresponding small scale cells 200a and 200b from each of the small scale cells 200a and 200b. In order to calculate an optimal delay parameter, a probability distribution function of a time in which user terminals stay within an area of the small scale cells 20a and 20b in each of the small scale cells 20a and 20b is required. This is referred to as a staying time distribution function, and the staying time distribution function may be acquired by applying known numerical estimation to staying time measurement data, which are measurement data of an actual staying time of user terminals.

The network management entity calculates a probability histogram on a time basis of a staying time distribution of a corresponding small scale cell, i.e., a staying time probability histogram, using actual staying time measurement data (S320).

The network management entity calculates a staying time distribution function of a closed form by applying known numerical estimation to a staying time probability histogram of a small scale cell (S330). Numerical estimation may be freely designated by a system designer and a manager.

When a staying time distribution function is calculated, the network management entity receives a discrimination reference time $T_{Th}$ of a temporary user from a network manager and calculates a probability in which improper delay is to occur, using the discrimination reference time $T_{Th}$ (S340). A probability in which improper delay is to occur can be obtained using Equation 2.

$$\int_{d}^{d+T_{Th}} f(t)dt = F(d+T_{Th}) - F(d), \quad 0 \leq d \leq T_{Th} \qquad \text{[Equation 2]}$$

In Equation 2, d represents a delay parameter, and $T_{Th}$ represents a discrimination reference time of a temporary user. f(t) represents a probability density function of a staying time of a user, and F(t) represents a cumulative distribution function of a staying time of a user. In this case, F(t) represents a relationship of Equation 3.

$$F(t) = \int_0^\infty f(t)dt \quad \text{[Equation 3]}$$

The delay parameter d should be determined to minimize Equation 2. Therefore, when a reference time ($T_{Th}$ of Equation 2) of a temporary user is designated by a network manager, a network management entity determines the delay parameter d to minimize Equation 2. When a reference time ($T_{Th}$ of Equation 2) of a temporary user is designated by a network manager, determining the delay parameter d in order to minimize Equation 2 may be represented in a mathematical optimization form of Equation 4.

$$\operatorname{argmin}_d \int_d^{d+T_{Th}} f(t)dt = \operatorname{argmin}_d F(d+T_{Th}) - F(d),\ 0 \le d \le T_{Th} \quad \text{[Equation 4]}$$

When Equation 4 is solved using a known numerical optimization scheme, the delay parameter d may be obtained (S350). The numerical optimization scheme may also be freely designated by a system designer and a manager.

In this way, the delay parameter d is calculated using actual staying time measurement data. In an exemplary embodiment of the present invention, in order to use actual staying time measurement data, a staying time distribution record protocol for collecting a staying time distribution record of users staying in the small scale cell 20 is provided.

Figure 4:
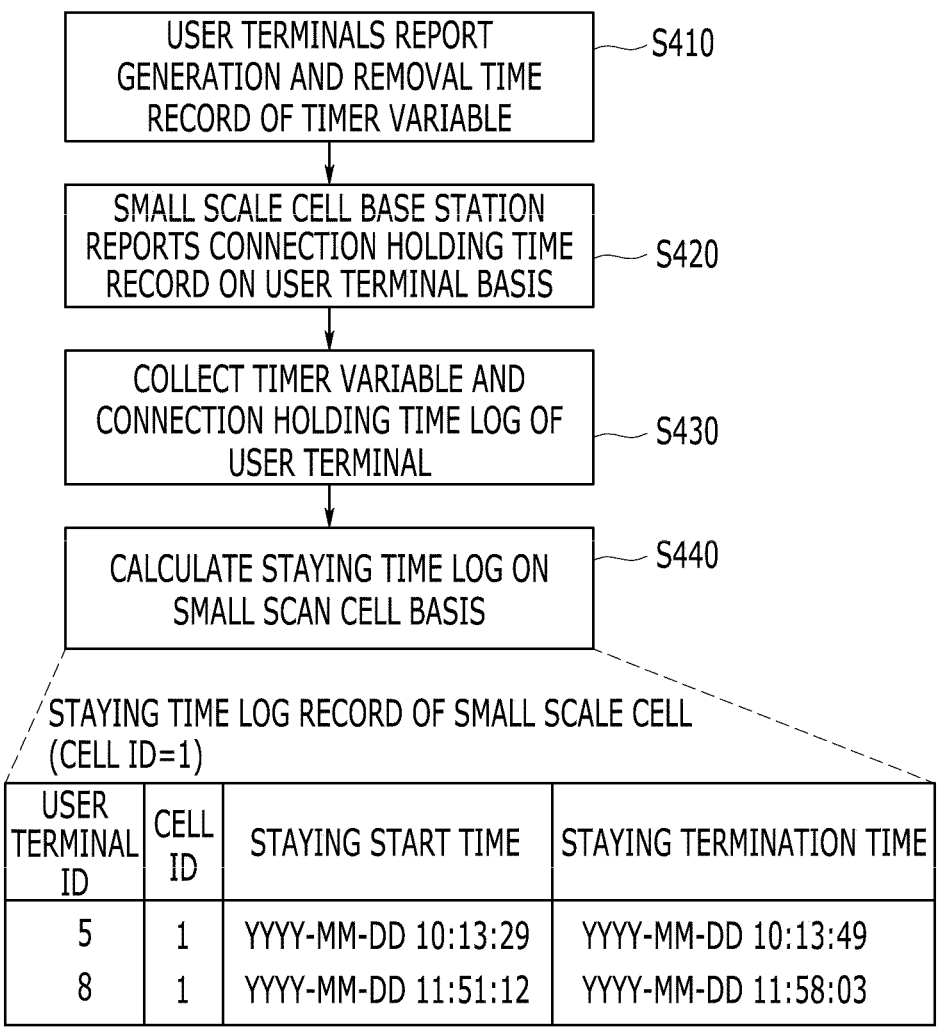
FIG. 4 is a diagram illustrating a staying time distribution record protocol according to an exemplary embodiment of the present invention.

FIG. 4 is a diagram illustrating a staying time distribution record protocol according to an exemplary embodiment of the present invention.

In general, when it is determined that the user terminal 300 enters an area of the small scale cell 20a and the user terminal 300 immediately performs handover, a connection holding time of the user terminal 300 that is connected to the small scale cell 20 is used as a staying time. However, in an exemplary embodiment of the present invention, a connection holding time to the small scale cell base station 200 cannot be used as a staying time. The reason thereof is that in the user terminal 300 staying in an area of the small scale cell 20a for a lesser time than a time of a delay parameter, a connection to the small scale cell 20a is not performed, and in the user terminal 300 staying in an area of the small scale cell 20a for a longer time than a time of a delay parameter, a connection holding time is a time of a delay parameter that is subtracted from an entire staying time. Therefore, in order to acquire an accurate staying time of the user terminal 300 of the small scale cell 20a, generation and removal records of a timer variable in which the user terminal 300 uses should be collected.

Referring to FIG. 4, user terminals within an area that a network management entity manages as well as the user terminal 300 periodically report a generation and removal time record of a timer variable in which user terminals generate and remove to a subject, i.e., a network management entity that calculates a delay parameter (S410). If a subject that calculates the delay parameter is the small scale cell base station 200a to which the user terminal 300 is connected, the user terminal 300 periodically reports a generation and removal time record of the timer variable that the user terminal 300 generates and removes to the small scale cell base station 200a to which the user terminal 300 is connected. Here, in the record that should be reported, an identifier ID of the user terminal 300, an identifier of a small scale cell, a generation time of a timer variable, a removal time of a timer variable, and data on whether handover is performed may be included. The generation and removal time of a timer variable may be expressed in a form of a timestamp string that may be expressed in a millisecond or microsecond unit. Whether handover is performed represents a removal reason of a timer variable. If the timer variable is removed before a time of a delay parameter has elapsed due to dissatisfaction of a handover criterion, it means that the user terminal is a temporary visitor and thus whether handover is performed may be displayed with data having a meaning of No. If a timer variable is removed while starting handover from a macrocell to a small scale cell at a time point at which a time of a delay parameter is exceeded, the timer variable may be displayed with data having a meaning of "Yes". It is unnecessary for records of a timer variable are frequently reported, and records of a timer variable may be reported once every several minutes or every several hours. Therefore, the record may be implemented using a communication protocol operating in a TCP/IP upper level hierarchy, as in socket communication, and a specific protocol and a report cycle for exchanging a message can be freely set by a system designer and a network manager.

Further, the small scale cell base station 200a that is connected to the user terminal 300 reports a connection holding time record on each user terminal basis to the network management entity (S420). The small scale cell base station 200a may report a connection holding time record on a user terminal basis to a separate staying time data record server. In this case, a subject that calculates a delay parameter may request and acquire a connection holding time record of a corresponding user terminal from a staying time record server. In this case, a record to be reported may include data of an identifier of a user terminal, an identifier of a small scale cell, a connection start time, and a connection release time. The connection start time is a time at which connection setting is started between a user terminal and a small scale cell in which handover is performed. The connection release time is a time at which connection setting is released while a user terminal that has been connected performs handover to a macrocell and another small scale cell. The small scale cell base station 200 may report these records once every several minutes or every several hours. Further, a specific protocol and a report cycle for exchanging a message can be freely set by a system designer and a network manager.

The network management entity collects a timer variable and a connection holding time log (S430), and calculates a staying time log record on a small scale cell basis (S440). That is, when a generation and removal record of a timer variable of the small scale cell base station and user terminals is fully collected, by arranging the record, the network management entity calculates a staying time distribution log record of a user terminal on a small scale cell basis. The staying time log may be recorded as a staying start time and a staying termination time of a user terminal on a small scale cell basis.

Figure 5:
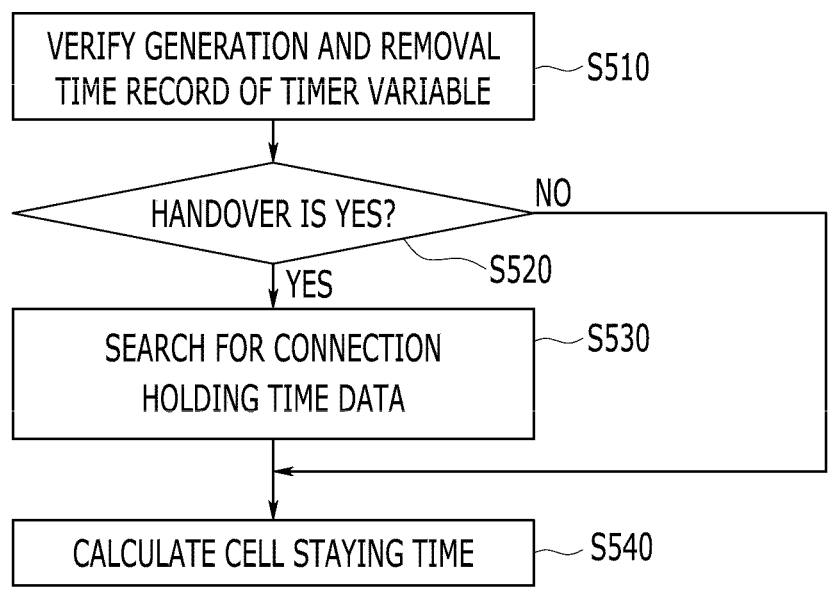
FIG. 5 is a flowchart illustrating a method of calculating a staying time log record according to an exemplary embodiment of the present invention.

FIG. 5 is a flowchart illustrating a method of calculating a staying time log record according to an exemplary embodiment of the present invention.

Referring to FIG. 5, the network management entity verifies generation and removal time record data of a timer variable (S510). The network management entity determines whether handover is Yes (S520), and if handover is No, it means that the user terminal 300 is a temporary visitor that enters an area of the small scale cell 20a and for which use of handover is suppressed. Therefore, the network management entity calculates and records a cell staying time (S540). The cell staying time may be calculated as a timer variable removal time-a generation time of a timer variable. If handover is Yes at step S520, it means that the user terminal 300 stays in the cell longer than a time of a delay parameter and handover is performed. In this case, the network management entity searches for connection holding time data having the same cell identifier as that of the terminal identifier from a connection holding time record that is collected from the small scale cell base station 200a (S530) and searches for a record in which a connection is started immediately after a timer variable is removed, and calculates a cell staying time (S540). The cell staying time may be a connection release time-a generation time of a timer variable.

For example, when the network management entity finds log data of a timer variable in which a terminal identifier, a cell identifier, a generation time, and a removal time of a timer variable, and whether handover is performed, are "terminal 2, cell 3, YYYY-MM-DD 04:08:27.3528, YYYY-MM-DD 04:11:11.2543, Yes", respectively, handover of a corresponding log is Yes and thus the network management entity searches for a connection holding time log in which the terminal 2 is connected to the cell 3. The network management entity searches for log data of the earliest timer variable in a record that is connected after YYYY-MM-DD 04:11:11.2543. If log data of this time are "terminal 2, cell 3, YYYY-MM-DD 04:11:11.3426, YYYY-MM-DD 04:15:36.7913", a generation time of a timer variable and a termination time of a connection holding time log are collected, and a cell staying time of "terminal 2, cell 3, YYYY-MM-DD 04:08:27.3528, YYYY-MM-DD 04:15:36.7913" may be calculated.

Figure 6:
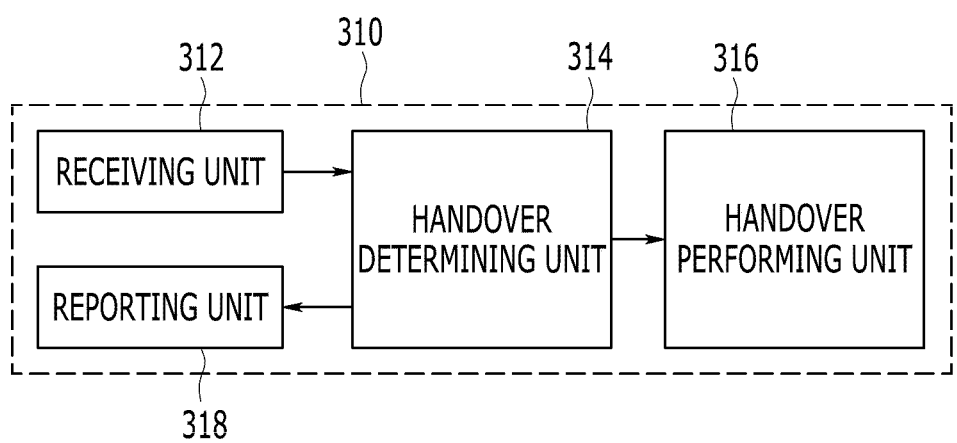
FIG. 6 is a diagram illustrating a handover apparatus of a user terminal according to an exemplary embodiment of the present invention.

FIG. 6 is a diagram illustrating a handover apparatus of a user terminal according to an exemplary embodiment of the present invention.

Referring to FIG. 6, a handover apparatus 310 of the user terminal 300 includes a receiving unit 312, a handover determining unit 314, a handover performing unit 316, and a reporting unit 318.

When the user terminal 300 approaches the small scale cell base station 200a, the receiving unit 312 receives a signal that is transmitted by the small scale cell base station 200a and the macrocell base station 100. In this case, a weak signal that is transmitted by the small scale cell base station 200b may be received.

When the handover determining unit 314 receives a signal that is transmitted by the small scale cell base station 200a and/or the macrocell base station 100, the handover determining unit 314 periodically measures intensity of the received signal and determines whether a handover criterion to the small scale cell base station 200a is satisfied.

As described with reference to FIG. 2, if a handover criterion to the small scale cell base station 200a is satisfied, the handover determining unit 314 acquires a delay parameter from a received signal, generates a timer variable, and stores a generation time of a timer variable. Further, the handover determining unit 314 determines whether a handover criterion is satisfied using a signal that is received from the small scale cell base station 200a and/or the macrocell base station 100 after generating a timer variable, and whenever a handover criterion is satisfied, the handover determining unit 314 generates a timer variable and calculates a delay time using a difference between a present time and a generation time of a timer variable. In this way, the handover determining unit 314 periodically calculates a delay time, and when the calculated delay time is larger than or equal to a time of a delay parameter of the small scale cell 20a, the handover determining unit 314 determines handover to the small scale cell 20a. After the handover determining unit 314 determines handover to the small scale cell 20a, the handover determining unit 314 removes a corresponding timer variable and stores a generation time and removal time of a corresponding timer variable.

When a handover criterion is again not satisfied after a timer variable is generated, the handover determining unit 314 determines the user terminal 300 as a temporary user and limits handover.

When handover to the small scale cell 20a is determined by the handover determining unit 314, the handover performing unit 316 performs handover to the small scale cell 20a.

The reporting unit 318 periodically reports a generation and removal time record of a timer variable that the user terminal 300 generates or removes to the small scale cell base station 200a to which a network management entity or the user terminal 300 is connected.

Figure 7:
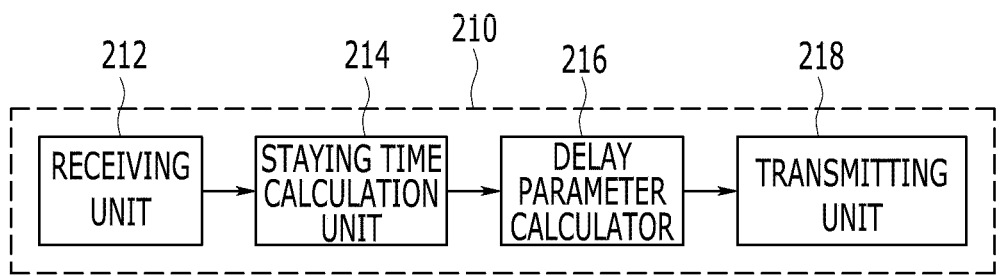
FIG. 7 is a diagram illustrating a network management entity according to an exemplary embodiment of the present invention.

FIG. 7 is a diagram illustrating a network management entity according to an exemplary embodiment of the present invention.

In FIG. 7, the network management entity may be a small scale cell base station 200a that a user terminal approaches, but hereinafter, it is assumed that the network management entity is a separate entity from the small scale cell base station 200a.

Referring to FIG. 7, a network management entity 210 includes a receiving unit 212, a staying time calculation unit 214, a delay parameter calculator 216, and a transmitting unit 218.

The receiving unit 212 receives staying time measurement data of each user terminal of a corresponding small scale cell from each of the small scale cell base stations 200a and 200b. Further, the receiving unit 212 periodically receives a generation and removal time record of a timer variable that the user terminal 300 generates and removes.

The staying time calculation unit 214 calculates a staying time distribution function using staying time measurement data and a generation and removal time record of a timer variable of each user terminal of the corresponding small scale cells 20a and 20b from each of the small scale cell base stations 200a and 200b. That is, as described with reference to FIGS. 3 and 4, the staying time calculation unit 214 calculates a staying time probability histogram of staying time distribution of the corresponding small scale using actual staying time measurement data of each user terminal and calculates a staying time distribution function by applying known numerical estimation to a staying time probability histogram of a small scale cell.

The delay parameter calculator 216 receives a discrimination reference time $T_{Th}$ of a temporary user from a network manager and calculates a delay parameter using Equations 2 to 4 in order to minimize a probability in which improper delay is to occur using the discrimination reference time $T_{Th}$.

The transmitting unit 218 provides a delay parameter to the user terminal 300.

According to an exemplary embodiment of the present invention, by adding a delay time condition to a handover determination algorithm, handover between a macrocell and a small scale cell of temporary users staying in a small scale cell for a smaller time than a delay time can be suppressed. Therefore, unnecessary handover that is performed to temporary users of a small scale cell can be reduced. Further, when a threshold time for discriminating a temporary user that is designated by a network manager is given, a method of calculating an optimal delay time is also provided and thus probability of improper delay can be minimized.

Further, an exemplary embodiment of the present invention can be applied to almost all communication technologies (3GPP-based, 3GPP2-based, and IEEE 802.16-based) used in a hierarchical cellular environment.

An exemplary embodiment of the present invention may not only be embodied through the above-described apparatus and/or method, but may also be embodied through a program that executes a function corresponding to a configuration of the exemplary embodiment of the present invention or through a recording medium on which the program is recorded and can be easily embodied by a person of ordinary skill in the art from a description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method in which a user terminal that is connected to a macrocell performs handover to a small scale cell within a macrocell area, the method comprising:
   determining whether a handover criterion is satisfied for a time period of a delay parameter of the small scale cell when the user terminal enters the small scale cell; and
   determining handover to the small scale cell when the handover criterion is continuously satisfied for the time period of the delay parameter.

2. The method of claim 1, further comprising receiving the delay parameter from a network management entity.

3. The method of claim 2, wherein the receiving the delay parameter comprises receiving the delay parameter from the network management entity through a control channel or a control message.

4. The method of claim 1, wherein the determining of whether a handover criterion is satisfied comprises:
   receiving a signal from a base station of the macrocell and a base station of the small scale cell for the time period of the delay parameter;
   determining whether the handover criterion is satisfied using the received signals for the time period of the delay parameter;
   generating a timer variable and calculating a delay time whenever the handover criterion is satisfied; and
   determining the handover when the delay time is larger than or equal to the time of the delay parameter.

5. The method of claim 4, wherein the calculating of a delay time comprises calculating the delay time by a difference between a generation time of the timer variable and a time at which the handover criterion is satisfied.

6. The method of claim 4, wherein the determining of whether a handover criterion is satisfied using the received signal comprises determining that the handover criterion is satisfied when intensity of a signal that is received from the base station of the macrocell is smaller than a signal threshold of the base station of the macrocell and when intensity of a signal that is received from the base station of the small scale cell is larger than a signal threshold of the base station of the macrocell.

7. The method of claim 1, wherein the delay parameter is acquired by applying numerical estimation to staying time measurement data of user terminals within an area of the small scale cell.

8. The method of claim 7, wherein the determining of whether a handover criterion is satisfied comprises:
   generating a timer variable whenever the handover criterion is satisfied for a time period of the delay parameter;
   removing the timer variable when the handover criterion is not satisfied again for the time period of the delay parameter; and
   determining the handover and removing the timer variable when the handover criterion is satisfied for the time period of the delay parameter,
   wherein the staying time measurement data are measured using a generation time and a removal time of the timer variable and a connection holding time with a base station of the small scale cell.

9. The method of claim 8, further comprising periodically reporting a generation time and a removal time of the timer variable and whether handover is performed to a base station of the small scale cell or a network management entity.

10. The method of claim 1, further comprising determining a temporary user and sustaining a connection to a base station of the macrocell when a handover criterion is not continuously satisfied for the time period of the delay parameter.

11. An apparatus for determining handover of a user terminal to a small scale cell within a macrocell area in a macrocell, the apparatus comprising:
    a handover determining unit that acquires a delay parameter of the small scale cell and delays handover for the time period of the delay parameter of the small scale cell and then determines the handover when the user terminal enters the small scale cell; and
    a handover performing unit that starts handover with the user terminal and the small scale cell when the handover is determined.

12. The apparatus of claim 11, wherein the handover determining unit determines handover to the small scale cell when a handover criterion is continuously satisfied for the time period of the delay parameter and sustains a connection to the macrocell when the handover criterion is not satisfied again for the time period of the delay parameter.

13. The apparatus of claim 12, wherein the handover determining unit determines whether the handover criterion is satisfied using intensity of signals that are received from a base station of the macrocell and a base station of the small scale cell.

14. The apparatus of claim 12, wherein the handover determining unit calculates a delay time by generating a timer variable whenever a handover criterion is satisfied for the time period of the delay parameter and determines handover to the small scale cell when the delay time is larger than or equal to the time of the delay parameter.

15. The apparatus of claim 14, wherein the handover determining unit removes the timer variable when the handover criterion is not satisfied again or when the handover is determined for the time period of the delay parameter.

16. The apparatus of claim 15, further comprising a reporting unit that periodically reports a generation time and a removal time of the timer variable to a network management entity,
    wherein the network management entity calculates the delay parameter using the generation time and the removal time of the timer variable and a connection holding time of user terminals within an area of the small scale cell.

17. The apparatus of claim 16, wherein the handover determining unit receives the delay parameter from the network management entity through a control channel or a control message.

18. A method of determining a delay parameter in a network management entity that manages a small scale cell within a macrocell area, the method comprising:
    calculating staying time measurement data of user terminals within a small scale cell area;
    calculating a delay parameter by applying numerical estimation to the staying time measurement data; and transmitting the delay parameter to a user terminal that enters the small scale cell in a state in which it is connected to the macrocell, wherein handover to the small scale cell is delayed by the user terminal for a time period of the delay parameter.

19. The method of claim 18, wherein the calculating of staying time measurement data comprises:

receiving a connection holding time of user terminals in which the small scale cell has been connected to a base station from a base station of the small scale cell;

receiving a generation time of a timer variable that is generated whenever a handover criterion is satisfied for the time period of the delay parameter and a removal time of the removed timer variable when a handover criterion is not satisfied again for the time period of the delay parameter and when the handover is determined in the small scale cell from user terminals, having received the delay parameter; and calculating the staying time measurement data using the connection holding time and a generation time and a removal time of the timer variable.

20. The method of claim 18, wherein the transmitting of the delay parameter comprises transmitting the delay parameter through a control channel or a control message.

* * * * *